United States Patent
Auerbach et al.

(10) Patent No.: US 6,659,481 B2
(45) Date of Patent: Dec. 9, 2003

(54) ATTACHMENT OF A VEHICLE AXLE TO AN AXLE SUSPENSION

(75) Inventors: Michael Auerbach, Stuttgart (DE); Michael Helfrich, Altbach (DE); Lothar Noll, Waiblingen (DE); Michael Schober, Remseck (DE)

(73) Assignee: DaimlerChrysler AG, Stuttgart (DE)

( * ) Notice: Subject to any disclaimer, the term of this patent is extended or adjusted under 35 U.S.C. 154(b) by 21 days.

(21) Appl. No.: 10/012,781

(22) Filed: Nov. 5, 2001

(65) Prior Publication Data
US 2002/0074762 A1 Jun. 20, 2002

(30) Foreign Application Priority Data
Nov. 4, 2000 (DE) ........................................ 100 54 839

(51) Int. Cl.[7] ............................................... B60G 17/00
(52) U.S. Cl. ................................................... 280/124.1
(58) Field of Search ...................... 280/124.1, 124.164, 280/124.166, 124.163, 679, 680, 684, 686; 403/270, 271, 272; 267/52

(56) References Cited

U.S. PATENT DOCUMENTS

| 1,314,817 | A | * | 9/1919 | Laycock ....................... 267/52 |
| 4,348,131 | A | * | 9/1982 | Shimanuki et al. ......... 403/272 |
| 6,406,044 | B1 | * | 6/2002 | Wisotzky ................. 280/124.1 |

FOREIGN PATENT DOCUMENTS

EP 0 810 109 12/1997

* cited by examiner

Primary Examiner—Paul N. Dickson
Assistant Examiner—Faye M. Fleming
(74) Attorney, Agent, or Firm—Kenyon & Kenyon

(57) ABSTRACT

An attachment of a vehicle axle to an axle suspension of a vehicle, such as a utility vehicle, includes a first plate element arranged on the upper side of the vehicle axle, a second plate element arranged on the lower side of the vehicle axle, and at least one spring clip, which connects the vehicle axle to an axle spring suspension of the axle suspension via the plate elements. To simplify assembly and mounting of this attachment, at least one web which is attached on its upper side to the first plate element and on its lower side to the second plate element may be arranged on each side of the vehicle axle so that the vehicle axle is completely surrounded and enclosed by the webs and the plate elements.

17 Claims, 1 Drawing Sheet

ATTACHMENT OF A VEHICLE AXLE TO AN AXLE SUSPENSION

FIELD OF THE INVENTION

The present invention relates to an attachment of a vehicle axle to an axle suspension of a vehicle, in particular a utility vehicle.

BACKGROUND INFORMATION

An attachment of this kind, in which a vehicle axle equipped with vehicle wheels is fixed to a vehicle frame via an axle suspension, is described in European Published Patent Application No. 0 810 109. This axle mounting and axle suspension includes an axle spring suspension having a rodshaped steering rod, one end of which is swivelably mounted on the vehicle body, i.e., vehicle frame, and the other end of which is anchored to the vehicle body via a pneumatic shock absorption system. The vehicle axle is attached to this steering rod. To accomplish this, a first plate element is arranged on the upper side of the vehicle axle. A second plate element is arranged on the lower side of the vehicle axle and is placed on the upper side of the steering rod. A third plate element is arranged on the lower side of the steering rod. Two U-shaped spring clips cooperate with the plate elements and are used to attach the vehicle axle to the steering rod, and the vehicle axle is thereby also connected to the axle spring suspension. The spring clips have two parallel arms which are connected to one another via a base. In order to attach the vehicle axle to the steering rod, the base of each spring clip rests against the outer side of the first plate element, which faces away from the vehicle axle, the spring arms extending laterally along the vehicle axle. Thus, the spring arms extend beyond the first plate element and pass through the second plate element and third plate element via openings provided for this purpose. The spring clips are bolted using nuts on the outer side of the third plate element that faces away from the steering rod. Herein, pre-tensioning between the plate elements can be created via the spring clips, and as a general rule this pre-tensioning is greater than the anticipated axle loads to be absorbed by the axle spring suspension under normal conditions.

The forces and moments acting on the vehicle wheels and vehicle axle are transferred to the vehicle frame via a connection of this kind that joins the axle spring suspension to the vehicle axle, subject to spring cushioning. For example, when the vehicle is braked and accelerated, tilt moments arise in the vehicle axle. Lateral forces acting on the vehicle wheels, e.g., when the vehicle takes a curve or drives over an obstacle where there is a sharp angle between the vehicle wheel in question and the obstacle, result in lateral guide forces in the vehicle axle. Furthermore, support forces that result from the vehicle's total mass and, for example, are multiplied for a short time when the vehicle drives over a pothole, arise. To ensure these forces are transferred without risk of damaging the vehicle axle, the attachment of the vehicle axle to the axle suspension must meet very high quality standards.

An attachment of the vehicle axle to the vehicle suspension of this kind is relatively expensive to implement, because in order to pre-tension the spring clips, a predefined relative position of the vehicle axle, the steering rod and axle spring suspension, and the three plate elements must be set.

It is an object of the present invention to provide an attachment of the aforementioned kind having a simplified assembly process.

SUMMARY

The above and other beneficial objects of the present invention are achieved by providing an attachment as described herein.

The present invention is based on the principle that the first plate element arranged on the upper side of the vehicle axle and the second plate element arranged on the lower side of the vehicle axle are connected to one another via lateral webs so that the vehicle axle is completely surrounded and enclosed by the webs and the plate elements. As a result, the plate elements are in a defined position relative to one another, it being possible to accomplish this as part of a pre-assembly process at the vehicle axle, so that mounting the vehicle axle, which in the aforementioned respect has been pre-assembled, in the axle suspension is simplified.

According to one example embodiment of the present invention, the webs may be configured and connected to the plate elements so that they function as tensile bars that pre-tension the plate elements toward each other, the vehicle axle thus being clamped between the plate elements. In accordance with this measure, the relative position of the plate elements relative to the vehicle axle is also defined, so that this assembly step may be performed as part of a pre-assembly process. Due to the pre-tensioning via which the plate elements and the webs are clamped around the vehicle axle, movements of the plate elements and the vehicle axle relative to one another are substantially eliminated. This extends the life of the vehicle axle.

The webs may extend alongside and at a lateral distance from the vehicle axle, so as to prevent physical contact between the webs and the vehicle axle. This arrangement also tends to prevent wear and tear and thus extends the vehicle axle's life.

To ensure that load is transferred between the vehicle axle and the plate elements in a manner that extends working life particularly successfully, the inside contour of the lower side of the first plate element may be configured to complement the outer contour of the upper side of the vehicle axle. Furthermore, the inside contour of the upper side of the second plate element may be configured to complement the lower side of the vehicle axle. Due to these measures, the plate elements and the vehicle axle are in contact over a relatively large area, so that the surface load on the vehicle axle is reduced.

The object of the present invention may also be achieved via a method described herein. The method according to the present invention is based on the principle that during attachment of the webs, the plate elements are pre-tensioned toward each other via external loads, so that the vehicle axle is clamped between them. If the webs are then attached to the plate elements, once the outside loads have been removed, they function as tensile bars and thus also establish pre-tensioning between the plate elements via internal forces, and as a result the vehicle axle is clamped between the plate elements and fixed in position.

A welding method may be used to attach the webs to the plate elements, because a welded joint contracts as it cools, which means substantial pre-tensioning forces and clamping forces may be achieved.

Further features and advantages of the device according to the present invention are set forth in the dependent claims and indicated in the drawings and the accompanying description relating to the drawings.

The features indicated above and the features explained below may be used not only in the combination indicated but also in other combinations or alone, without this going beyond the scope of the present invention.

An example embodiment of the present invention is illustrated in the drawings and described in greater detail below.

DETAILED DESCRIPTION

Figure 1:
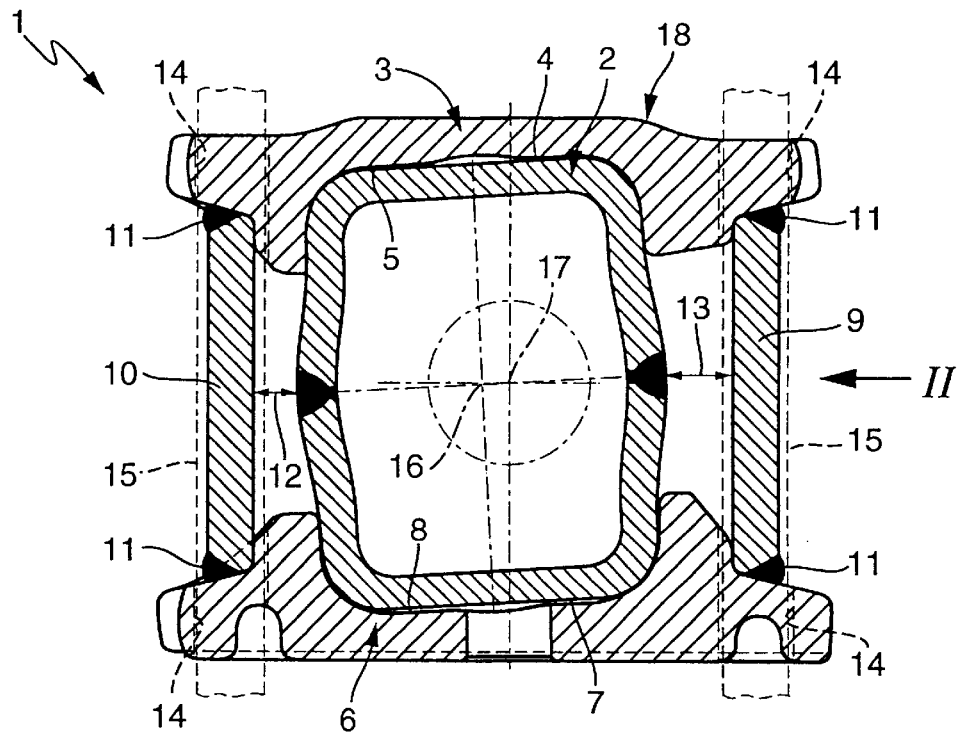
FIG. 1 is a schematic cross-sectional view through an attachment according to the present invention.
Figure 2:
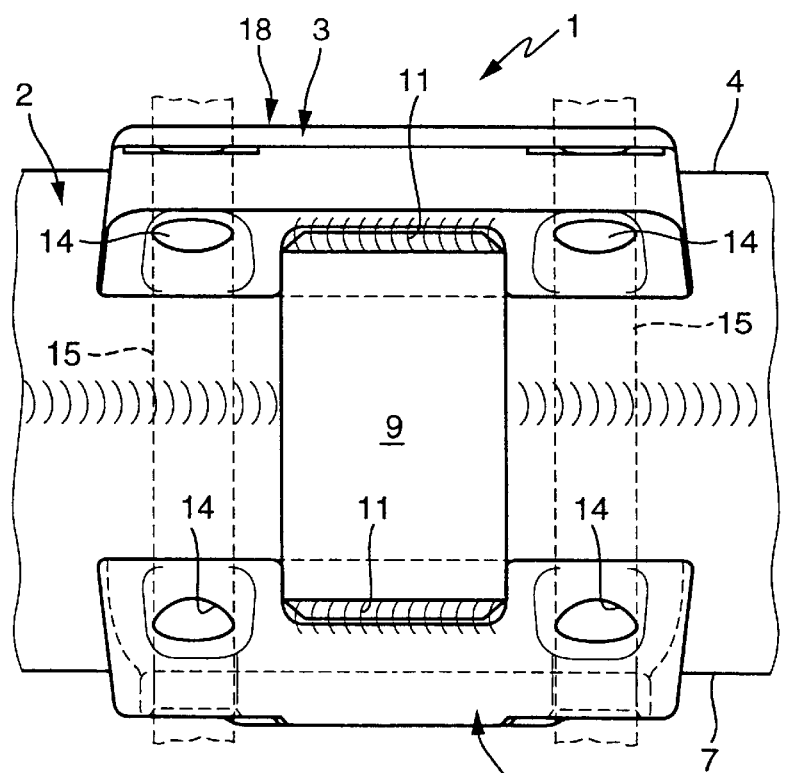
FIG. 2 is a side view of an axial section of a vehicle axle in the area of the attachment according to the present invention taken in the direction indicated by arrow II illustrated in FIG. 1.

As illustrated in FIGS. 1 and 2, attachment 1, i.e., an arrangement for attaching a vehicle axle 2 to an axle suspension of a vehicle, in particular a utility vehicle includes first plate element 3, which is arranged on upper side 4 of vehicle axle 2 and is directly on top of vehicle axle 2. Lower side 5 of first plate element 3 includes an inside contour that complements the outer contour of upper side 4 of vehicle axle 2. As a result, plate element 3 is in contact with vehicle axle 2 over a large area.

Attachment arrangement 1 also includes second plate element 6, which is arranged on lower side 7 of vehicle axle 2 and is in direct contact with vehicle axle 2. Upper side 8 of second plate element 6 may also include an inside contour that complements the outer contour of lower side 7 of vehicle axle 2. Second plate element 6 is thus also in contact with vehicle axle 2 over a large area.

Plate-shaped webs 9 and 10 extend alongside vehicle axle 2 on each side. Webs 9, 10 respectively are attached on their upper side to first plate element 3 and on their lower side to second plate element 6. This attachment may be accomplished via welded joint 11, which in this case is a butt weld. Webs 9 and 10 extend a lateral distance 12, 13 from vehicle axle 2, which prevents interaction, in particular physical contact, between webs 9, 10 and vehicle axle 2. Plate elements 3, 6, along with webs 9, 10, which are immovably attached to them, thus form sleeve 18, which completely surrounds vehicle axle 2, is particularly rigid, and possesses a high degree of dimensional stability.

On each side of vehicle axle 2, each plate element 3, 4 includes two pass-through openings 14 through which spring clips 15 pass when vehicle axle 2 is to be connected to an axle spring suspension in accordance with the arrangement that includes plate elements 3, 6 and webs 9, 10. Spring clips 15 are indicated by broken lines. Spring clips of this kind are termed "clamps."

As is illustrated in FIG. 1, vehicle axle 2 may be inclined relative to sleeve 18, which encloses it completely, with respect to longitudinal central axis 16 of vehicle axle 2, and may be arranged eccentrically. As illustrated in FIG. 1, a longitudinal central axis of sleeve 18 is denoted as 17. Plate elements 3, 6, extend substantially horizontally, and webs 9 and 10 extend substantially vertically.

As illustrated in FIG. 2, in the axial direction of vehicle axle 2, webs 9, 10 extend roughly centrally between spring clips 15. Thus webs 9, 10 are attached symmetrically to plate elements 3, 6, thereby ensuring that load is transferred symmetrically between plate elements 3, 6 and vehicle axle 2.

Webs 9, 10 may be attached to plate elements 3, 6 so that a predefined pre-tension is set between plate elements 3, 6 and drives plate elements 3, 6 onto each other so that vehicle axle 2 is clamped between plate elements 3 and 4. Webs 9, 10 function as tensile bars that transfer the pre-tensioning as internal forces.

In accordance with webs 9, 10, plate elements 3, 6 are connected to one another and fixed in position at vehicle axle 2 as part of a pre-assembly process, and, as a result, the final assembly process in which vehicle axle 2 is mounted in an axle suspension is simplified.

What is claimed is:

1. An attachment of a vehicle axle to an axle suspension of a vehicle, comprising:
   a first plate element arranged on an upper side of the vehicle axle;
   a second plate element arranged on a lower side of the vehicle axle;
   at least one spring clip connecting the vehicle axle to an axle spring suspension of the axle suspension via the first plate element and the second plate element; and
   at least one web arranged on each side of the vehicle axle, an upper side of each web being attached to the first plate element and a lower side of each web being attached to the second plate element;
   wherein the vehicle axle is completely surrounded and enclosed by the at least one web, the first plate element and the second plate element.

2. The attachment according to claim 1, wherein each web is attached to the first plate element and to the second plate element via welded joints.

3. The attachment according to claim 2, wherein the welded joints include butt welds.

4. The attachment according to claim 1, wherein each web is configured to pre-tension the first plate element and the second plate element toward each other and to clamp the vehicle axle between the first plate element and the second plate element.

5. The attachment according to claim 1, wherein each web extends alongside the vehicle axle at a lateral distance therefrom.

6. The attachment according to claim 1, wherein each web is plate-shaped.

7. The attachment according to claim 1, wherein an inside contour of a lower side of the first plate element complements an outer contour of the upper side of the vehicle axle.

8. The attachment according to claim 1, wherein an inside contour of an upper side of the second plate element complements an outer contour of the lower side of the vehicle axle.

9. The attachment according to claim 1, wherein at least one of the first plate element and the second plate element includes pass-through openings for the spring clips.

10. The attachment according to claim 1, wherein the vehicle includes a utility vehicle.

11. The attachment according to claim 1, wherein the first plate directly contacts the upper side of the vehicle axis.

12. The attachment according to claim 1, wherein the second plate directly contacts the lower side of the vehicle axis.

13. The attachment according to claim 1, wherein the first plate directly contacts the upper side of the vehicle axis and the second plate directly contacts the lower side of the vehicle axis.

14. The attachment according to claim 1, wherein the first plate has openings for passage of the spring clip.

15. The attachment according to claim 1, wherein the first plate and second plate have openings for passage of the spring clip.

16. A method of manufacturing an attachment of a vehicle axle to an axle suspension of a vehicle, the attachment including a first plate element arranged on an upper side of the vehicle axle, a second plate element arranged on a lower side of the vehicle axle, at least one spring clip connecting the vehicle axle to an axle spring suspension of the axle suspension via the first plate element and the second plate element and at least one web arranged on each side of the vehicle axle, an upper side of each web being attached to the first plate element and a lower side of each web being attached to the second plate element, the vehicle axle being completely surrounded and enclosed by the at least one web, the first plate element and the second plate element, each web being configured to pre-tension the first plate element and the second plate element toward each other and to clamp the vehicle axle between the first plate element and the second plate element, the method comprising the steps of:

placing the first plate element and the second plate element on the vehicle axle;

applying a predefined force to the first plate element and the second plate element to pre-tension the first plate element and the second plate element toward one another;

attaching a respective web to each of the first plate element and the second plate element; and removing the force applied to the first plate element and the second plate element.

17. The method according to claim 16, wherein the attaching step includes the substep of attaching the respective web to the first plate element and the second plate element with a welding process.

* * * * *